Patented Dec. 30, 1941

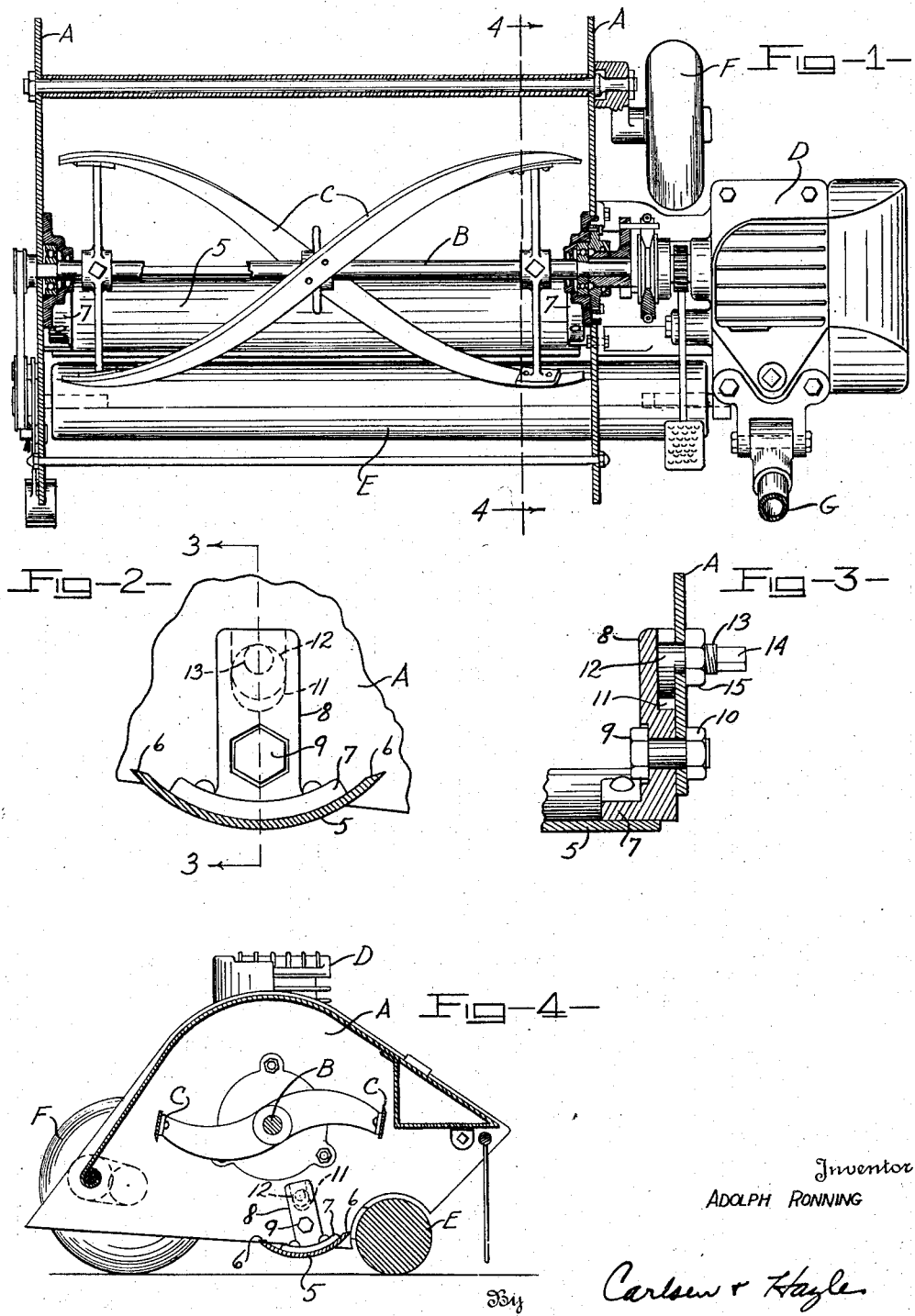

2,268,226

UNITED STATES PATENT OFFICE 2,268,226

LAWN MOWER CUTTING MECHANISM

Adolph Ronning, Minneapolis, Minn.

Original application July 27, 1938, Serial No. 221,538, now Patent No. 2,238,707, dated April 15, 1941. Divided and this application May 31, 1940, Serial No. 338,008

4 Claims. (Cl. 56—249)

My invention relates to improvements in cutting mechanisms for lawn mowers.

The primary object of the invention is to provide an improved ledger bar or fixed blade device for cooperation with the rotary cutter of a reel type of mower and with means whereby the bar or knife may be reversed end to end in the mower to use either of two cutting edges with which it is provided. Another object is to provide improved supporting and mounting means for the bar or knife and by means of which it may be conveniently adjusted to proper cooperative cutting position with respect to the rotary cutter.

These and other more detailed and specific objects will be disclosed in the course of the following specification, reference being had to the accompanying drawing, in which—

Fig. 1 is a plan view of a mower embodying my invention and with certain frame parts shown in section to better illustrate the construction.

Fig. 2 is an enlarged fragmentary vertical cross section through my ledger bar or knife assembly.

Fig. 3 is a vertical section along the line 3—3 in Fig. 2.

Fig. 4 is a vertical section along the line 4—4 in Fig. 1.

It is here noted that this application is a division from my copending application for United States patent on a Lawn mower, Serial No. 221,538, filed July 27, 1938, now Patent No. 2,238,707, granted April 15, 1941. Reference to this prior application is invited for a complete disclosure of the construction, operation, and advantages of the mower per se, and the present disclosure will be limited to details essential to the description of the subject of invention herein.

The mower comprises a frame or housing including transversely spaced upright end plates or members A through which is journaled the cutter shaft B carrying the spiral cutter or reel blades C. The cutter is power rotated by the power unit D and the mower is supported by the rearwardly arranged ground roller E and a single forward ground wheel F. A handle, fragmentally shown at G, is used to manipulate and guide the mower.

The cutter blades C cooperate with the ledger bar, fixed knife, or blade 5 which is arranged just clear of, or in shearing relation to, the blades as they travel their orbital path as will best be understood from Fig. 4. This bar 5 in accordance with my invention is formed or pressed from sheet material and given a concavo-convex or arcuate cross sectional shape as shown, both in order to afford it rigidity and to make it easy to provide the necessary sharpened edges by simply beveling off both upwardly bowed edges as represented at 6. At its ends the bar 5 is riveted or bolted to the arcuate inwardly turned ends 7 of hangers or mounting members 8 which are turned upwardly to fit nicely between inner faces of the mower frame ends A. Bolts 9 are passed through these hangers 8 and through the members A on transverse axes just a short distance above the ledger bar and it will be evident that the entire assembly of ledger bar and its hangers may be rocked back and forth on the pivot axes thus formed in order to bring the bar into proper cutting relationship to the cutter blades C.

The bar is mounted on the frame members A slightly to the rear of the vertical plane passing through the cutter shaft B (Fig. 4) and therefore only the forwardly disposed edge of the bar will be in cutting position. As this edge is dulled the bar may obviously be reversed end for end in the mower frame to present the other edge in cutting position, thus effectively doubling the usual life of the ledger bar. The bolts 9 may be reversed for this purpose by unscrewing their outwardly disposed nuts 10.

Upwardly of the bolts 9 the hangers 8 are provided with upwardly and outwardly opening recesses or grooves 11 in which are disposed cams 12 carried eccentrically at the inner ends of studs 13 which are extended outwardly through the frame members A. The cams 12 are of such diameter that they just nicely fit between the opposite front and rear upright edges of the grooves 11 and by turning the cams it will obviously be possible to urge the upper ends of the hangers 8 either forwardly or rearwardly as the case may be. Such operation oscillates or rocks the hangers about the pivots formed by the bolts 9 and results in the adjustment of the cutting edge of the ledger bar toward or away from the path of the cutter blades C.

For this purpose the studs 13 carrying the cams 12 have their outer ends reduced and squared off at 14 and lock nuts 15 are provided on the studs on outer surfaces of the frame members. By the use of a wrench, therefore, the studs may be turned to move the cams as required and the adjustment secured by tightening the lock nuts.

The ledger bar as it is adjusted moves in a vertical plane and in a fore and aft direction due to its overhead pivots and as a result the plane of movement of the cutting edge is substantially tangential to the cutter. The adjustment may therefore be made very precisely, as will be evident.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a lawn mower, a frame, a rotary cutter journaled in the frame and having blades adapted to travel a circular path, a unitary ledger plate of arcuate formation in cross section for coaction with the rotary cutter, said ledger plate possessing sufficient rigidity to act as a brace between the sides of the frame, and means for adjustably supporting the unitary ledger plate, said means engageable with the ledger plate only at the ends thereof to increase grass clearance between the frame portions, the adjustable supporting means for the ledger plate extending through the frame and being operable at the outer sides of the frame.

2. In a lawn mower, a frame, a rotary cutter journaled on a transverse axis in the frame, a unitary ledger plate for cooperative cutting action with the rotary cutter, said unitary ledger plate being substantially parallel with the ground line during normal operation of the mower, hanger members substantially perpendicular to the ledger plate and having pivotal connections between their upper and lower ends with the frame and swingably supporting the ledger plate at their lower ends for adjustment toward and away from the cutter, adjusting means associated with the upper ends of the hanger members extending through the frame and operable at the outer sides of the frame for swinging the hanger members and ledger plate in the frame, and said pivotal connections and adjusting means being located substantially along radial lines extending downwardly from the cutter axis.

3. In a lawn mower, a frame, a rotary cutter mounted in the frame and having blades adapted to turn about the cutter axis, a unitary ledger plate substantially parallel with the ground line during normal operation of the mower, hanger members substantially perpendicular to the ledger plate pivotally connected to the frame between the upper and lower ends thereof and supporting the ledger plate at their lower ends for swinging movements toward and away from the path of the cutter blades, means for engaging the upper ends of the hanger members for swinging the same about the axes of their pivotal connections with the frame, and both the said adjusting means and the pivotal connections being located between the axis of the cutter and the path of the cutter blades and extending through the frame to the exterior thereof for operation at the outer sides of the frame.

4. In a lawn mower wherein a frame carries a rotating reel cutter with a ledger plate cooperating therewith, such ledger plate being of one-piece construction and supported from the frame by supports located wholly above the plate faces and secured to the upper plate face in a manner to locate the supports symmetrically to the width of the ledger plate to thereby place the lower face of the ledger plate as the bottom of the plate assembly, whereby such lower face is spaced from the ground surface for grass clearance purposes, said ledger plate being arcuate in cross section and said ledger plate and its supports providing a substantially rigid structure between the sides of the frame whereby the ledger plate curvature and the supports therefor permit adjustment of the plate without affecting the grass clearance space dimensions.

ADOLPH RONNING.